United States Patent [19]

Buehler et al.

[11] B 3,925,346

[45] Dec. 9, 1975

[54] MIXED CHROMIUM-CONTAINING AZO DYESTUFFS CONTAINING, PER ATOM OF CHROMIUM, ONE MOLECULE OF AN O,O'-DIHYDROXY-SULPHOPHENYLENE-AZO-NAPHTHALENE AND ONE MOLECULE OF AN -O-HYDROXYPHENYLENE-AZO-ACETOACETAMIDE

[75] Inventors: Arthur Buehler, Rheinfelden; Hans-Ulrich Schuetz, Basel, both of Switzerland

[73] Assignee: Ciba-Geigy AG, Basel, Switzerland

[22] Filed: Oct. 19, 1971

[21] Appl. No.: 190,679

[44] Published under the Trial Voluntary Protest Program on January 28, 1975 as document no. B 190,679.

Related U.S. Application Data

[63] Continuation-in-part of Ser. No. 820,334, April 29, 1969, abandoned.

[30] Foreign Application Priority Data

May 14, 1968 Switzerland.................... 7130/68

[52] U.S. Cl................. 260/145 A; 8/13; 8/50; 260/151; 260/193
[51] Int. Cl.² ... C09B 45/06; D06P 3/00; D06P 3/04
[58] Field of Search ........................... 260/145 A

[56] References Cited
UNITED STATES PATENTS

| | | | |
|---|---|---|---|
| 2,012,779 | 8/1935 | Straub et al. | 260/145 A |
| 2,674,515 | 4/1954 | Widmer et al. | 260/145 A |
| 2,776,956 | 1/1957 | Zickendraht et al. | 260/145 A |
| 2,806,760 | 9/1957 | Brassel et al. | 260/145 A UX |
| 2,814,614 | 11/1957 | Zickendraht | 260/145 A |
| 2,820,784 | 1/1958 | Zickendraht et al. | 260/151 |
| 2,855,392 | 10/1958 | Buehler et al. | 260/145 A |
| 3,203,948 | 8/1965 | Neier | 260/145 A |
| 3,221,003 | 11/1965 | Scholl et al. | 260/145 A |
| 3,314,932 | 4/1967 | Scholl et al. | 260/145 A |

*Primary Examiner*—Floyd Dale Higel
*Attorney, Agent, or Firm*—Joseph G. Kolodny; Edward McC. Roberts; Prabodh I. Almaula

[57] ABSTRACT

The invention relates to metal compounds which contain one molecule each of two different monoazo dyestuffs, one of which corresponds to the formula

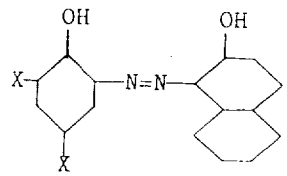

in which one X represents a nitro group and the other X a sulphonic acid group, and the other corresponds to the formula

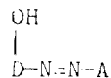

in which D represents the residue of a diazo component of the benzene series bound to the azo bridge in vicinal position to the hydroxyl group and A represents the residue of an acetoacetamide which is bound to the azo bridge in vicinal position to the enolized keto group; the new dyestuffs are especially valuable for dyeing wool and leather and yield brown dyeings of good general fastness properties such as light, washing, perspiration, dry and wet rubbing, and great tinctorial strength.

7 Claims, No Drawings

MIXED CHROMIUM-CONTAINING AZO DYESTUFFS CONTAINING, PER ATOM OF CHROMIUM, ONE MOLECULE OF AN O,O'-DIHYDROXY-SULPHOPHENYLENE-AZO-NAPHTHALENE AND ONE MOLECULE OF AN -O-HYDROXYPHENYLENE-AZO-ACETOACETAMIDE

This application is a continuation-in-part of application Ser. No. 820,334, filed Apr. 29, 1969, and now abandoned.

The present invention is based on the observation that valuable new chromiferous azo dyestuffs in which one atom of chromium is bound in complex union with one molecule each of different monazo dyestuffs, may be obtained when a metallizable monazo dyestuff which is free from carboxylic and sulphonic acid groups and corresponds to the formula (1) 

in which D represents the residue of a diazo component of the benzene series which is bound to the azo bridge in vicinal position to the hydroxyl group and A represents the residue of an acetoacetamide which is bound to the azo bridge in vicinal position to the enolised keto group, is reacted in a molecular ratio of about 1:1 with a complex chromium compound which contains one atom of chromium bound in complex union with one molecule of monoaze dyestuff of the formula (2) 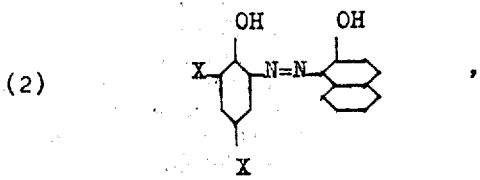

in which one X represents a nitro group and the other X a sulphonic acid group.

The monoazo dyestuffs of formula (1) required in the present process can be manufactured in known manner by coupling an ortho-hydroxydiazo compound of the benzene series with an acetoacetamide capable of coupling in the ortho-position to the enolised keto group in a weakly acetic, neutral or alkaline medium. As has been mentioned above, the components must be free from carboxylic and sulphonic acid groups. Preferably, they are also free from functionally modified sulphonic acid groups, for instance free from sulphonamide and sulphonic acid ester groups. It is also advantageous to choose components that give rise to dyestuffs which contain no hydroxyl groups apart from those in the ortho-position to the azo group which are concerned with the formation of the complex metal compound. Having regard to these conditions, the monoazo dyestuffs of formula (1) may be synthesized, for example, from the following components:

As diazo components those may be used which contain further substituents apart from the hydroxyl and the amino group, for example, nitro groups, halogen atoms (for example chlorine or bromine), $C_{1-5}$alkyl groups (for example methyl, isopropyl and butyl), $C_{1-5}$alkoxy groups (for example methoxy, propoxy or isobutoxy) or acylamino groups, especially those which contain only few, that is to say for instance up to four carbon atoms (for example acetylamino or propionylamino). The group D may be more specifically defined as phenyl or phenyl substituted with up to three (preferably two) groups selected from halogen (bromo, chloro), nitro, $C_{1-5}$alkyl, $C_{1-5}$alkoxy, $C_{1-4}$alkanoylamino, sulfonamido, N-phenylsulfonamido or N-(carboxyphenyl)sulfonamido. Preferably D is nitrophenyl or nitrophenyl substituted by chloro, nitro or $C_{1-4}$alkanoylamino. Particularly useful are those 1-hydroxy-2-aminobenzene derivatives that contain a substituent in 4-position, preferably a nitro group.

As relevant examples the following may be mentioned: 4- or 5-chloro-2-amino-1-hydroxybenzene, 4,6-dichloro-2-amino-1-hydroxybenzene, 3,4,6-trichloro-2-amino-1-hydroxybenzene, 4-chloro-5- or -6-nitro-2-amino-1-hydroxybenzene, 6-nitro-4-methyl-2-amino-1-hydroxybenzene, 6-nitro-4-acetylamino-2-amino-1-hydroxybenzene, 4,6-dinitro-2-amino-1-hydroxybenzene and especially 4- or 5-nitro-2-amino-1-hydroxybenzene, 4-nitro-6-chloro-2-amino-1-hydroxybenzene and 4-nitro-6-acetylamino-2-amino-1-hydroxybenzene.

Especially suitable coupling components are those acetoacetamides which are free from sulphur-containing substituents. The coupling component may be further defined as a group of the formula

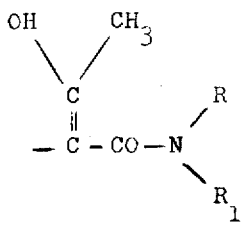

wherein R and $R_1$ may each independently be hydrogen, $C_{1-5}$alkyl, $C_{1-5}$alkoxyalkyl, phenyl-$C_{1-2}$alkyl, cyclopentyl, cyclohexyl, phenyl and phenyl substituted with up to two groups selected from $C_{1-5}$alkoxy, $C_{1-5}$alkyl, and halogen (chloro, bromo). Preferably, R and $R_1$ are each hydrogen, $C_{1-5}$alkyl and phenyl, and especially R is hydrogen and $R_1$ is phenyl or said substituted phenyl. Examples of such acetoacetamides are: acetoacetamido, acetoacetic acid-N-isopropyl-, -N-butyl-, -N-dimethyl-, -N-diethyl-, -N-dibutyl-, -N-methoxypropyl- or -N-benzylamide, acetoacetic acid-N-methyl or -N-ethylanilide, acetoacetylaminocyclohexane, acetoacetylaminobenzene, 1-acetoacetylamino-2,4-dimethoxybenzene, 1-acetoacetylamino-2,5-dimethylbenzene or -dimethoxybenzene, 1-acetoacetylamino-2- or -4-ethylbenzene, 1-acetoacetylamino-2- or -4-chlorobenzene, 1-acetoacetylamino-2,5-dichlorobenzene, 1-acetoacetylamino-4-methylbenzene or -4-methoxybenzene and 1-acetoacetylamino-2-methyl-3-chlorobenzene.

The monoazo dyestuffs of formula (2) can also be manufactured by a known coupling method and conversion into the 1:1-chromium complex is carried out in the usual manner, for example by reacting it is an acidic medium with an excess of a salt of trivalent chromium, for example chromium formate, sulphate or fluoride, at the boil or if desired, at a temperature above 100°C. In this connection it is in general advantageous to carry out the metallization in known manner, for example in the presence of an organic solvent, for example an alcohol or formamide.

In general it is advantageous not to dry the starting materials required for carrying out the present process after their manufacture and isolation but to work them up in the form of a moist paste.

The reaction of the 1:1-chromium complex with the metal-free dyestuffs is advantageously carried out in an aqueous, neutral or weakly alkaline medium, under atmospheric or superatmospheric pressure, at room temperature or with heating, for example at a temperature of from 50° to 120°C. An addition of a solvent, for example an alcohol, formamide or the like, may in certain circumstances promote the reaction. In general it is advantageous to react as far as possible equivalent amounts of the 1:1-chromium complex and of the metal-free dyestuff, the molecular ratio between the metal-free dyestuff and the 1:1-complex being advantageously at least 0.85:1 and at most 1:0.85. An excess of metal-free dyestuff is as a rule less disadvantageous than an excess of metal-free dyestuff. The closer this ratio approaches 1:1, the better the results obtained in general.

The new chromiferous mixed complexes obtainable by the present process are suitable for dyeing or printing a wide variety of materials, especially for dyeing animal materials for example silk, wool or leather, and also for dyeing or printing synthetic fibres of polyamides, polyurethanes or polyacrylonitrile. They are specially suitable for dyeing from a neutral or weakly acidic, for example acetic acid bath. The dyeings obtained in this manner are level and have good fastness to light, water, washing, perspiration, fulling, dry and wet rubbing, milling, decatizing and carbonizing, which enables them to be used instead of the so-called after-chroming dyestuffs or single-bath chroming dyestuffs; compared with the latter they have the advantage that the dyeing process involved is much simpler and takes less time.

It is a special advantage of the present dyestuffs that they have great tinctorial strength since even when a relatively small quantity of dyestuff is used, valuable covered shades in the brown to olive range can be obtained.

Unless otherwise indicated, parts and percentages in the following Examples are by weight.

EXAMPLE 1

43.9 Parts of the 1:1-chromium complex of the dyestuff obtained from diazotized 5-nitro-1-amino-2-hydroxybenzene-3-sulphonic acid and 2-hydroxynaphthalene, and 34.2 parts of the dyestuff obtained from diazotized 4-nitro-2-aminophenol and acetoacetanilide are stirred in 2,000 parts of hot water and the resulting mixture is neutralized. Then 4.0 parts of sodium hydroxide and 6.2 parts of sodium acetate are added and the whole is stirred for 6 hours at 95° to 98°C. On completion of the reaction the batch is filtered and the dyestuff is salted out of the filtrate with sodium chloride, filtered and dried; it forms a brown powder which gives in water a yellow-brown and in concentrated sulphuric acid a blue-green solution. It dyes wool or leather from a weakly acidic bath yellow-brown shades having good fastness properties.

EXAMPLE 2

43.9 Parts of the 1:1-chromium complex of the dyestuff obtained from diazotized 3-nitro-1-amino-2-hydroxybenzene-5-sulphonic acid and 2-hydroxynaphthalene, and 34.2 parts of the dyestuff from diazotized 4-nitro-2-aminophenol and acetoacetamide are stirred in 2,000 parts of hot water, and the mixture is neutralized. 4.0 Parts of sodium hydroxide are added and the whole is stirred for 24 hours at 95° to 98°C. On completion of the reaction the dyestuff is salted out of the resulting solution with sodium chloride, filtered and dried; it forms a brown powder which gives in water a brown and in concentrated sulphuric acid a blue-green solution. It dyes wool or leather from a weakly acidic bath brown shades having good fastness properties.

In an identical manner the chromium-free dyestuffs in column I of the following Table can be reacted at a molecular ratio of 1:1 either with the 1:1-chromium compound of the monoazo dyestuff from diazotized 3-nitro-1-amino-2-hydroxybenzene-5-sulphonic acid and 2-hydroxynaphthalene, or with the 1:1-chromium complex compound of the monoazo dyestuff from diazotized 5-nitro-1-amino-2-hydroxybenzene-3-sulphonic acid and 2-hydroxynaphthalene, whereby 1:2-chromium complexes are formed with dye wool or leather the shades listed in column II.

| | I | II |
|---|---|---|
| 1 | 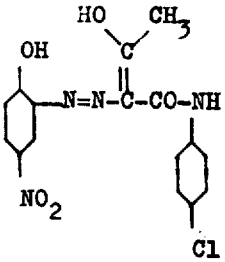 | brown |
| 2 | 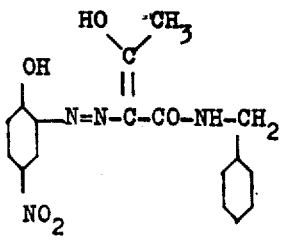 | " |

| | I | II |
|---|---|---|
| 3 | 2-hydroxy-5-nitrophenyl–N=N–C(=C(OH)CH₃)–CO–NH–(2,5-dichlorophenyl) | " |
| 4 | 2-hydroxy-3,5-dinitrophenyl–N=N–C(=C(OH)CH₃)–CO–NH–phenyl | yellow-brown |
| 5 | 2-hydroxy-5-nitrophenyl–N=N–C(=C(OH)CH₃)–CO–NH(CH₂)₃–OCH₃ | brown |
| 6 | 2-hydroxy-5-nitrophenyl–N=N–C(=C(OH)CH₃)–CO–NH–phenyl | brown-violet |
| 7 | 2-hydroxy-5-nitrophenyl–N=N–C(=C(OH)CH₃)–CO–NH–(2-ethylphenyl) | brown |
| 8 | 2-hydroxy-5-nitrophenyl–N=N–C(=C(OH)CH₃)–NH–CH(cyclohexyl) | " |

| | I | II |
|---|---|---|
| 9 | 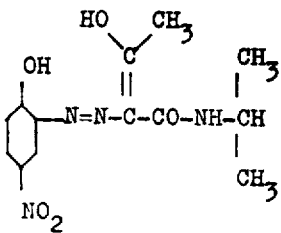 | " |
| 10 | 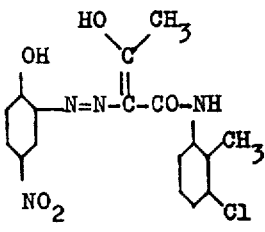 | brown |
| 11 | 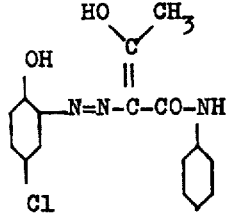 | reddish-brown |
| 12 | 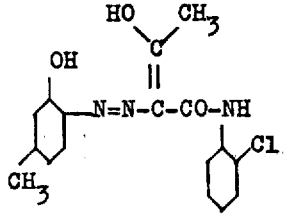 | " |
| 13 | 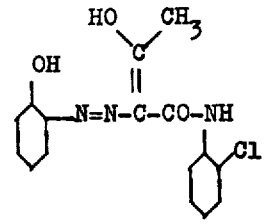 | " |
| 14 | 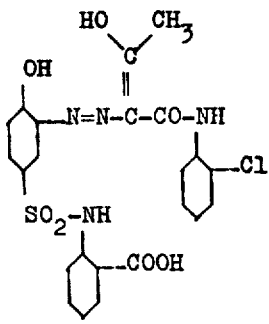 | yellowish-brown |

| | I | II |
|---|---|---|
| 15 | 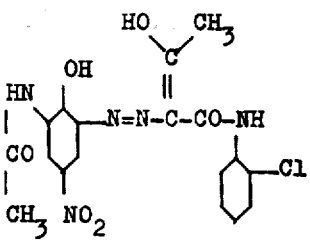 | yellowish-brown |
| 16 | 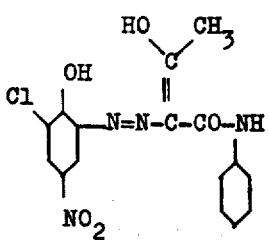 | " |
| 17 | 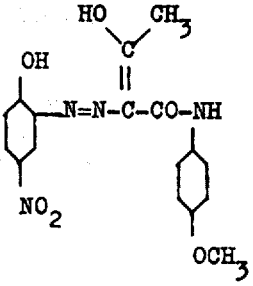 | brown |
| 18 | 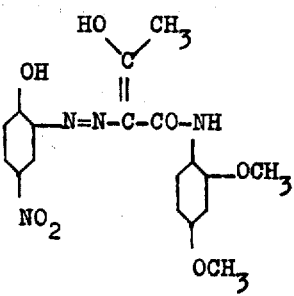 | " |
| 19 | 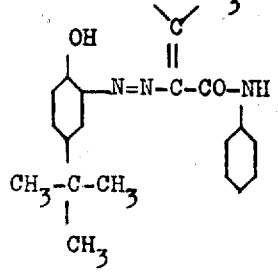 | reddish-brown |

Dyeing Instruction for wool

100 Parts of knitting wool are immersed at 50°C in a dyebath containing in 4,000 parts of water 2 parts of dyestuff and 4 parts of ammonium sulphate. The dyebath is heated to the boil within 45 minutes and kept at the boil for another 45 minutes. The wool is then taken out, thoroughly rinsed in cold water and dried.

Dyeing Instruction for leather

100 Parts of suede leather for clothing (dry weight) are fulled for 2 hours at 50°C in a solution of 2 parts of 24 percent ammonia in 1,000 parts of water and then dyed for 1 hour at 60°C in a solution of 2 parts of 24 percent ammonia and 6 parts of dyestuff in 1,000 parts of water. A solution of 4 parts of 85 percent formic acid in 40 parts of water is then added and the leather is dyed for another 30 minutes, thoroughly rinsed and if required or desired, treated for 30 minutes at 50°C with 2 parts of a dicyandiamide-formaldehyde condensate.

In the same manner other suede leathers and glove leathers can be dyed.

We claim:

1. A metal compound that contains one atom of chromium bound in complex union with one molecule each of two different monoazo dyestuffs, one of which corresponds to the formula

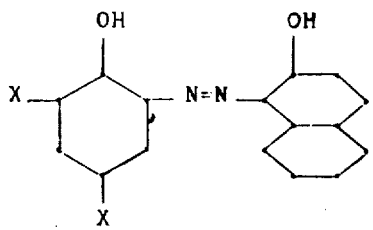

in which one X represents nitro and the other X is sulphonic acid, and the other monoazo dyestuff corresponds to the formula

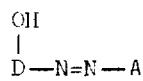

wherein D is selected from the group consisting of phenyl and phenyl substituted by up to three groups selected from the group consisting of chlorine bromine, nitro, $C_{1-5}$alkyl, $C_{1-5}$alkoxy, $C_{1-4}$alkanoylamino, sulfonamido, N-phenylsulfonamido and N-(carboxyphenyl)-sulfonamido; and A is an acetoacetamide group of the formula

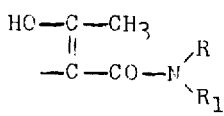

wherein R and $R_1$ are each independently hydrogen, $C_{1-5}$alkyl, $C_{1-5}$alkoxyalkyl, phenyl-$C_{1-2}$alkyl, cyclopentyl, cyclohexyl, phenyl and phenyl substituted by up to two groups selected from the group consisting of $C_{1-5}$alkoxy, $C_{1-5}$alkyl, chlorine and bromine.

2. A complex chromium compound as claimed in claim 1, wherein the acetoacetamide dyestuff corresponds to the formula

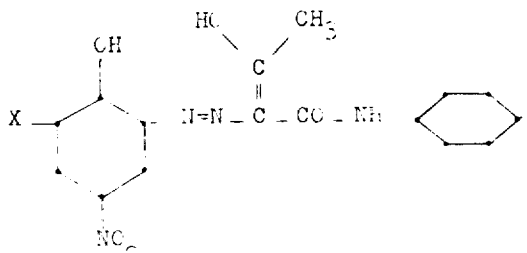

in which X represents hydrogen, chlorine, nitro or $C_{1-4}$alkanoylamino.

3. A complex chromium compound as claimed in claim 1, wherein the acetoacetamide dyestuff corresponds to the formula

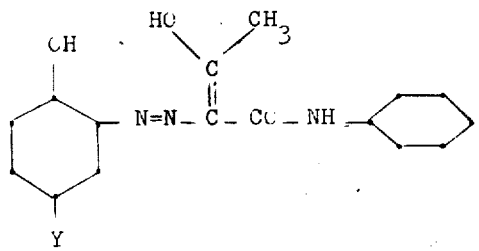

in which Y represents hydrogen, chlorine or nitro.

4. The complex chromium compound according to claim 1 and containing one atom of chromium bound in complex union to one molecule of the azo dyestuff of the formula

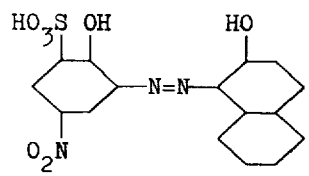

and one molecule of the azo dyestuff of the formula

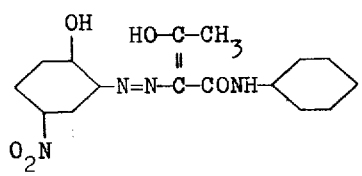

5. The complex chromium compound according to claim 1 and containing one atom of chromium bound in complex union to one molecule of the azo dyestuff of the formula

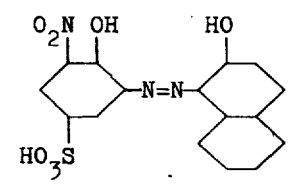

and one molecule of the azo dyestuff of the formula

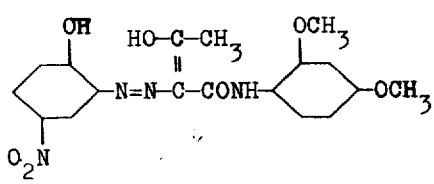

6. The complex chromium compound according to claim 1 and containing one atom of chromium bound in complex union to one molecule of the azo dyestuff of the formula

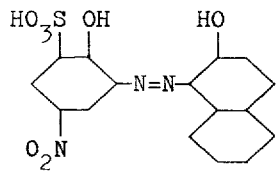

and one molecule of the azo dyestuff of the formula

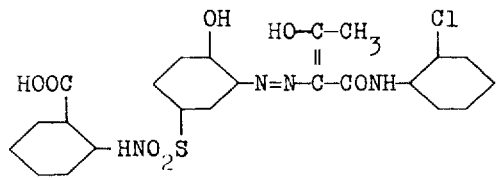

7. The complex chromium compound according to claim 1 and containing one atom of chromium bound in complex union to one molecule of the azo dyestuff of the formula

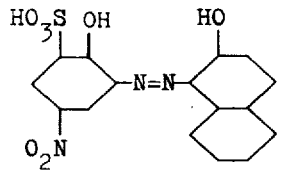

and one molecule of the azo dyestuff of the formula

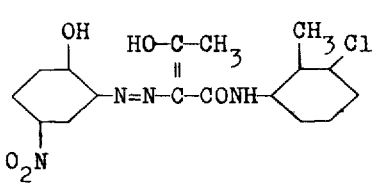

* * * * *